United States Patent [19]

Stokan

[11] Patent Number: 4,882,844

[45] Date of Patent: Nov. 28, 1989

[54] CHAIN SAW SAFETY BRAKE APPARATUS

[76] Inventor: Michael Stokan, Star Route West, Anaconda, Mont. 58711

[21] Appl. No.: 279,491

[22] Filed: Dec. 5, 1988

[51] Int. Cl.$^4$ ............................................. B27B 17/00
[52] U.S. Cl. .................................. 30/381; 188/77 R; 188/163
[58] Field of Search ............... 188/77 R, 163; 30/381, 30/382; 83/DIG. 1; 192/80, 85 C

[56] References Cited

U.S. PATENT DOCUMENTS

| | | | |
|---|---|---|---|
| 673,209 | 4/1901 | Lingemann | 188/163 |
| 2,804,945 | 9/1957 | Thierman | 188/77 R |
| 4,402,138 | 9/1983 | Glockle et al. | 30/382 |
| 4,573,556 | 3/1986 | Andreasson | 30/382 X |
| 4,594,780 | 6/1986 | Schlipmann et al. | 188/77 R X |

FOREIGN PATENT DOCUMENTS

| | | | |
|---|---|---|---|
| 438383 | 12/1926 | Fed. Rep. of Germany | 188/163 |
| 2207244 | 8/1972 | Fed. Rep. of Germany | 30/381 |
| 2556643 | 6/1985 | France | 30/381 |
| 175831 | 3/1922 | United Kingdom | 188/163 |

Primary Examiner—George E. A. Halvosa
Attorney, Agent, or Firm—Leon Gilden

[57] ABSTRACT

A manually manipulatable and portable chain saw includes an elongate brake band operatively associated with the cutting chain of the chain saw wherein the brake band is of a flaccid loop construction positioned for selective braking engagement with a brake drum. An electrical solenoid in electrical communication with the trigger switch of the chain actuates the solenoid upon release of the trigger switch to release the trigger switch by an operator.

3 Claims, 1 Drawing Sheet

CHAIN SAW SAFETY BRAKE APPARATUS

BACKGROUND OF THE INVENTION

1. Field of the Invention

The field of invention relates to chain saws, and more particularly pertains to a new and improved chain saw safety brake apparatus wherein the same utilizes an electrically actuatable solenoid for arresting movement of the cutting chain of the chain saw.

2. Description of the Prior Art

The use of safety brake apparatus in combination with chain saw devices is well known in the prior art. Prior art devices have typically utilized mechanical linkages associated with the friction brake drum to arrest movement of a cutting chain associated with a chain saw. The mechanical linkage devices normally extend outwardly of the chain saw enclosure and are subject to disrepair and malfunction due to the typical contact associated with chain saw use. For example, U.S. Pat. No. 4,334,357 to Baricevic sets forth a chain saw formed with a sensing handle mounted for movement whereupon forward positioning of the sensing arm tightens an associated braking band about a brake drum to halt movement of the cutting chain of the chain saw apparatus, as is typical of prior art devices.

U.S. Pat. No. 4,156,477 to Nagashima, et al., sets forth a braking system for a chain saw wherein a forward motion of a pivotally mounted sensing lever, as in the Baricevic patent, tightens a brake band for engagement of a braking device to halt the cutting chain of the apparatus.

U.S. Pat. No. 4,026,392 to Hirschkoff utilizes an overcentering actuating mechanism wherein a normally biased sensing lever effects pivoting of a sensing lever to mechanically position and engage a brake drum of an associated chain saw.

U.S. Pat. No. 3,776,331 to Gustafsson sets forth a further example of a mechanically biased sensing lever coupled to a brake band to mechanically pivot forwardly and arrest movement of a chain saw.

U.S. Pat. No. 3,664,390 to Mattsson, et al., sets forth yet another example of a mechanical biasing lever to engage a brake drum upon pivoting repositioning of an associated sensing lever.

As such, there continues to be a need for a new and improved safety brake mechanism for a chain saw which addresses both the problems of compactness and effectiveness in use and in this respect, the present invention substantially fulfills this need.

SUMMARY OF THE INVENTION

In view of the foregoing disadvantages inherent in the known types of chain saw safety brakes now present in the prior art, the present invention provides a chain saw safety brake apparatus wherein the same includes all of the operative components of the brake mechanism within the housing of the chain saw. As such, the general purpose of the present invention, which will be described subsequently in greater detail, is to provide a new and improved chain saw safety brake apparatus which has all the advantages of the prior art chain saw safety brakes and none of the disadvantages.

To attain this, the present invention comprises a brake drum mounted for rotation with an associatable chain saw sprocket including an elongate flaccid braking band secured at a stationary first end and further secured at a second end to an electrical solenoid mounted for reciprocation upon disengagement of the trigger switch of the chain saw thereby energizing the solenoid to tighten the brake band about the associated brake drum.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved chain saw safety brake apparatus which has all the advantages of the prior art chain saw safety brake apparatus and none of the disadvantages.

It is another object of the present invention to provide a new and improved chain saw safety brake apparatus which may be easily and efficiently manufactured and marketed.

It is a further object of the present invention to provide a new and improved chain saw safety brake apparatus which is of a durable and reliable construction.

An even further object of the present invention is to provide a new and improved chain saw safety brake apparatus which is susceptible of a low cost of manufacture with regard to both materials and labor, and which accordingly is then susceptible of low prices of sale to the consuming public, thereby making such chain saw safety brake apparatus economically available to the buying public.

Still yet another object of the present invention is to provide a new and improved chain saw safety brake apparatus which provides in the apparatuses and methods of the prior art some of the advantages thereof, while simultaneously overcoming some of the disadvantages normally associated therewith.

Still another object of the present invention is to provide a new and improved chain saw safety brake apparatus wherein the same includes an electrical solenoid associated with a chain saw switch to arrest movement of the chain saw upon disengagement of the switch by a user.

These together with other objects of the invention, along with the various features of novelty which characteristize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
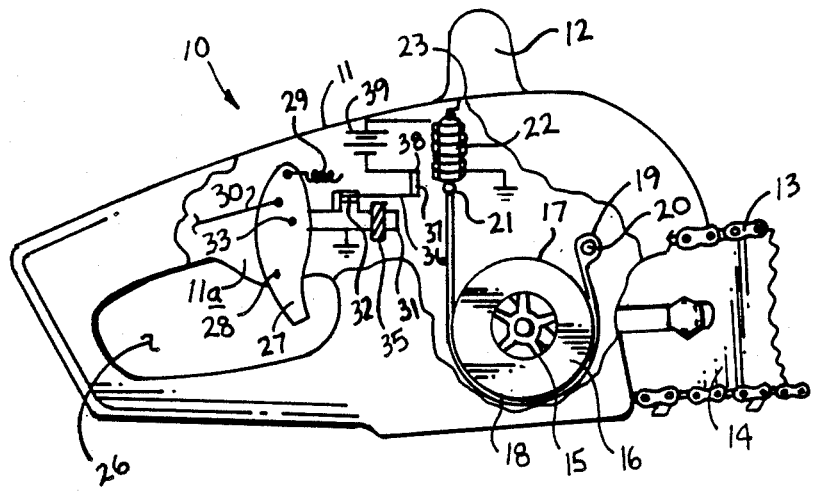
FIG. 1 is an orthographic view taken in elevation and partially in section of the invention.
Figure 2:
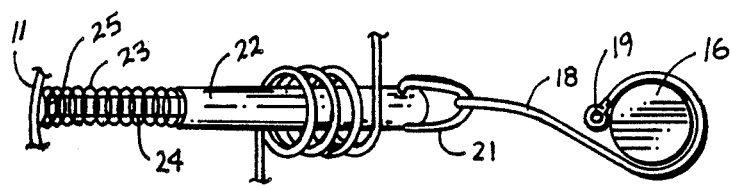
FIG. 2 is a diagrammatic isometric illustration of the invention isolated from the chain saw.
Figure 3:
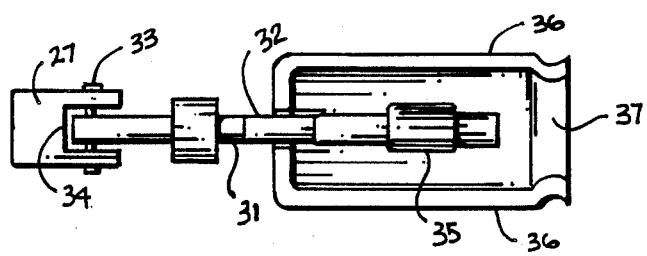
FIG. 3 is an orthographic top view of the trigger switch and associated linkage arrangement of the instant invention.

With reference now to the drawings, and in particular to FIGS. 1, 2, and 3 to thereof, a new and improved chain saw safety brake apparatus embodying the principles and concepts of the present invention and generally designated by the reference numeral 10 will be described.

More specifically, it will be noted that the chain saw safety brake apparatus 10 essentially comprises a housing 11 formed with a carrying handle 12. A forwardly extending cutting chain 13 is provided and cooperates with a chain bar 14 in a conventional manner. A rear sprocket hub 15 is fixedly secured to a brake drum 16 wherein the sprocket hub 15 accepts the rearwardmost loop of the cutting chain 13 in a manner well known in the prior art.

The brake drum 16 is formed with a friction surface 17 for cooperation with a flaccid brake band 18. The brake band 18 is formed with a first fixed end loop 19 fixedly secured to an anchor boss 20 where the boss 20 is fixedly secured to the housing 11.

The brake band 18 is formed with a second movable end loop 21. The movable end loop 21 is secured to a terminal end of a solenoid housing 22 aligned with the brake band 18. The solenoid housing includes a solenoid piston 23 reciprocatably mounted therewithin that is extended by means of return spring 24 captured between a return spring cap 25 rigidly secured to the piston 23 at one end wherein the spring 24 is captured between the cap 25 and the uppermost terminal end of the housing 22, as illustrated in FIG. 2 for example. Actuation of the solenoid 22 retracts the solenoid piston 23 therewithin against the force of the return spring 24 to tighten the brake band 18 about the brake drum 16 and arrest movement of the cutting chain 13. As illustrated in FIGS. 1 and 2, the solenoid piston 23 is reciprocatably mounted within the solenoid housing 22 at one end and pivotally secured interiorly of said chain saw housing 11 at its other end.

The housing 11 is formed with a through extending opening 26 wherein a trigger switch 27 is pivotally mounted to the housing 11 by means of an orthogonally oriented trigger pivot 28 positioned through a lowermost ear 11a of the housing extending into the opening 26.

The trigger switch 27 has secured thereto at an uppermost remote end a return spring 29 to maintain the switch in a position, as illustrated in FIG. 1, to arrest movement of the chain 13 and simultaneously release tension upon an associated carburetor cable 30 cooperating with a conventional carburetor within the housing 11.

The trigger switch 27 is formed with a "U" shaped trigger recess 34 accepting an elongate link 31 pivotally therein utilizing a through extending link pivot 33 extending through the trigger switch 27 and through the captured elongate link 31.

The link 31 is formed with an upwardly extending projection 32 medially positioned along the upper surface of the link 31 accepting a plurality of forwardly extending arms 36 extending parallel to link 31 and rigidly secured to the projection 32. A lower electrical contact 37 extends between the arms 36 and cooperates with an upper electrical contact 38 that is stationary and fixed within the housing 11. Upon release of the trigger switch 27, the switch will orient and position, as illustrated in FIG. 1, whereupon contact between the lower and upper electrical contacts 37 and 38 complete an electrical circuit wherein the solenoid 22 accepts electrical energy from a magneto power source 39 utilized in conventional chain saw construction to energize the solenoid 22 and constrict the brake band 18 about the brake drum 16, as noted above.

A hollow bushing 35 surrounds a forwardmost portion of the elongate link 31 to thereby stabilize the reciprocating motion of the link 31 within the housing 11 and maintain alignment of the respective lower and upper electrical contacts 37 and 38, for purposes as noted above.

As to the manner of usage and operation of the present invention, the same should be apparent from the above description and accordingly no further discussion relative to the manner of usage and operation shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A chain saw safety brake apparatus comprising, in combination,
    a chain saw including a housing and a cutting chain extending forwardly of said housing and rearwardly secured about a forwardly extending stationary bar, and a rotatable rear sprocket contained within said housing, said rear sprocket fixedly secured to a brake drum, and flaccid brake band overlying a substantial surface of said brake drum, said brake band secured to said housing at one end of said band and secured to an actuating means at a second end of said band wherein said actuating means is completely contained within said housing, and wherein said actuating means comprises an electrically actuatable solenoid, and wherein said housing is formed with an opening therethrough and a trigger switch is pivotally mounted within said housing extending downwardly into said opening, and said trigger switch includes an elongate link pivotally secured to said trigger switch, and said link includes a first contact portion secured to said link, and said first contact portion cooperates with a second contact portion wherein contiguous contact of said first contact portion with said second contact portion effects actuation of said solenoid means to tighten said band about said brake drum to arrest movement of said cutting chain, and wherein said trigger switch includes a "U" shaped recess to accept said elongate link therein, and said elongate linke is pivotally connected within said "U" shaped recess including an elongate pivot pin extending through said trigger switch and said elongate link, and wherein said elongate link is secured to said trigger switch at one end, and is slidably mounted within a surrounding bushing adjacent its other end to maintain alignment of said elongate link and said first contact portion, and wherein said elongate link includes a raised central portion, and said raised central portion has secured thereto a plurality of arms extending parallel to said elongate link forwardly thereof, and said first contact portion is secured at forwardmost ends of said arms.

2. A chain saw safety brake apparatus as set forth in claim 1 wherein a chain saw magneto is mounted in series with said first and second contact portions to provide electrical energy to said solenoid to actuate said solenoid.

3. A chain saw safety brake apparatus as set forth in claim 2 wherein said solenoid includes a reciprocatable piston, and said reciprocatable piston is fixedly secured to said housing at one end and reciprocatably mounted within said solenoid at its other end, and said reciprocatable piston is normally biased in an extended position with a captured spring between said solenoid housing and a spring cap secured axially about said reciprocating piston.

* * * * *